US008217754B1

(12) United States Patent
Lerner

(10) Patent No.: US 8,217,754 B1
(45) Date of Patent: Jul. 10, 2012

(54) SYSTEM, METHOD AND COMPUTER PROGRAM PRODUCT FOR REMOTELY ACTUATING A LOCK VIA A CELLULAR COMMUNICATION LINK

(76) Inventor: Moses Lerner, Brooklyn, NY (US)

( * ) Notice: Subject to any disclaimer, the term of this patent is extended or adjusted under 35 U.S.C. 154(b) by 652 days.

(21) Appl. No.: 12/378,764

(22) Filed: Feb. 19, 2009

Related U.S. Application Data

(60) Provisional application No. 61/065,829, filed on Feb. 19, 2008.

(51) Int. Cl.
*G05B 23/00* (2006.01)

(52) U.S. Cl. ........ 340/5.61; 340/5.64; 340/5.7; 455/420

(58) Field of Classification Search .................. 340/5.64
See application file for complete search history.

(56) References Cited

U.S. PATENT DOCUMENTS

| | | | | |
|---|---|---|---|---|
| 6,885,738 | B2 * | 4/2005 | White et al. | 379/102.06 |
| 2004/0198310 | A1 * | 10/2004 | Aerrabotu et al. | 455/404.1 |
| 2006/0143463 | A1 * | 6/2006 | Ikeda et al. | 713/182 |
| 2007/0290793 | A1 * | 12/2007 | Tran | 340/5.64 |

* cited by examiner

*Primary Examiner* — Benjamin C Lee
*Assistant Examiner* — Stephen Burgdorf

(57) ABSTRACT

A wireless lock actuating system allows user to remotely toggle an existing device between operating and non-operating modes. The system preferably includes a lock and a user interface that generates input signals upon receiving corresponding user inputs respectively. A communications network is communicatively linked to the user interface for transferring the input signals to a remote location, and a service provider is communicatively coupled to the user interface via the communications network. The service provider is responsive to the input signals by generating and transmitting instruction signals and inquiry signals upon receiving corresponding ones of the inputs signals respectively. A controller generates and transmits control signals to the lock upon receiving the instruction signals respectively. Thus, the lock is automatically toggled between locked and unlocked modes upon receiving the control signals from the controller respectively.

10 Claims, 4 Drawing Sheets

SYSTEM, METHOD AND COMPUTER PROGRAM PRODUCT FOR REMOTELY ACTUATING A LOCK VIA A CELLULAR COMMUNICATION LINK

CROSS REFERENCE TO RELATED APPLICATIONS

This application claims the benefit of U.S. Provisional Application No. 61/065,829, filed Feb. 19, 2008, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to remotely actuated lock systems and, more particularly, to a remotely actuated lock system that is accessible via a cellular communications network for allowing a user to toggle a lock via a cell phone.

2. Prior Art

Ever since its first appearance nearly eighty years ago, wireless remote technology has continuously evolved to make many aspects of everyday life more convenient. The first machines to be operated by remote control were used mainly for military purposes. Radio-controlled motorboats, developed by the German navy, were used to ram enemy ships in World War I. Twenty years later, radio controlled bombs and other remote control weapons were used in World War II. Once the wars were over, United States scientists began experimenting to find nonmilitary uses for the remote control. In the late 1940's, automatic car garage door openers were invented, and in the 1950's the fist TV remote controls were used. Today, remote keyless entry is a standard option on most new automobiles. Whether changing television channels from the comforts of the couch, adjusting the volume on the stereo while lying in bed, or unlocking the car door while ten feet away from the vehicle, consumers have fully embraced, and have come to depend, on the remote control.

Along with the remote control, another technological advance has changed lives over the world is the cellular phone. In 1994, 16 million Americans were subscribed to cellular phone services. By 2002, that number had ballooned to more than 140 million, and still shows no sign of slowing down. In fact, some experts predict that worldwide subscribership will reach 1.2 billion people by 2007.

The basic concept of cellular phones began in 1947, when AT&T researchers sought ways to increase the traffic capacity and frequency of mobile communication in police car radios. However, nonexistent technology and stringent FCC regulations postponed availability until 1982, when the FCC authorized commercial cellular use. As a result of this regulation, the scientific advances of the intervening years and increased competition among communications companies put the cellular telephone on the fast track.

Today's widespread use of these revolutionary devices is unsurprising, since they now offer a virtually endless array of benefits. In addition to serving as a practical means of communication while on the go, technological advances have evolved cell phones into mini computers. Capable of keeping consumers abreast of the latest stock quotes and delivering local weather updates, cellular and digital telephones have become practically indispensable to millions all over the world.

Accordingly, a need remains for a system, method and computer program product that enables a user to remotely actuate a locking system via a cellular communication link in order to utilize the versatility of mobile cell phones. The present invention satisfies such a need by providing a system, method and computer program product that is convenient and easy to use, lightweight yet durable in design, and designed for allowing a user to lock or unlock any lock by pressing certain buttons on any phone.

BRIEF SUMMARY OF THE INVENTION

In view of the foregoing background, it is therefore an object of the present invention to provide a remotely operable wireless communication system for actuating a lock between locked and unlocked modes via a cell phone. These and other objects, features, and advantages of the invention are provided by a remotely actuated lock system that provides users with security and control over various types of locking mechanism from remote locations. The user will be able to operate locks for whom he/she desires and whenever the user wants. For example, when on vacation in Switzerland, the user may open his/her lock in New York. Extending further, the system could permit a user who is out of town to unlock her door to allow entry, so that a neighbor could check on their pets. The system would further provide users with a portable remote alarm system.

The cell phone would act as a detector for the lock. Acting as a user interface, user's cell phone allows the user to check whether lock is opened or closed. With the present system, the user may open and close lock without having the inconvenience of carrying heavy bundles of keys. With the present invention, the user will have a versatile mechanism, which is always accessible. No need to fear losing or leaving a key inside a home or car.

In one embodiment, as an example, use of the present system would be very simple and straightforward. To access menu options of the present invention, the user would input a unique personal identification number (PIN) by pressing the numeric keypad on the cell phone. Once in the menu, the user would simply scroll through the options to select the desired actions. When any of the remote actions are performed with the phone, the controller is tuned to the specific frequency generated by the cellular communication link. Upon reception of the signal generated by the cell phone, the circuitry in the controller would generate an 'enable' signal to a logic device, which would apply a voltage level to an actuator of lock. In this manner, the lock can be secured or opened, depending on the desired action.

The present invention discloses a wireless lock actuating system for allowing a user to remotely toggle an existing device between operating and non-operating modes. Such wireless lock actuating system preferably includes a lock adapted to be housed in an existing object and a user interface adapted to be carried by the user. The user interface preferably generates input signals upon receiving corresponding user inputs respectively.

The present invention may further include a communications network communicatively linked to the user interface for transferring the input signals to a remote location. A service provider is disposed at the remote location may be communicatively coupled to the user interface via the communications network. Such a service provider is preferably responsive to the input signals by generating and transmitting instruction signals and inquiry signals upon receiving corresponding ones of the inputs signals respectively.

The present invention may further include a controller wirelessly coupled to the service provider, which is responsive to the instruction signals by generating and transmitting control signals to the lock upon receiving the instruction signals respectively. In this manner, the lock is automatically toggled between locked and unlocked modes upon receiving the control signals from the controller respectively.

Notably, the controller automatically generates and transmits response signals to the service provider upon receiving the inquiry signals from the service provider such that the service provider learns of unauthorized access to the lock. Thereafter, the service provider records and transmits the response signals to the user interface via the communications network such that the user learns of the unauthorized access to the lock.

In one embodiment, the user interface may include a mobile cell phone and the communications network may include a cellular communications network respectively.

In another embodiment, the user interface may include a LAN line phone and the communications network may include a POTS network respectively.

The service provider preferably includes a first communications device in communication with the user interface via the communications network. A processor may be electrically coupled directly to the first communications device, and a memory may be electrically coupled directly to the processor. The memory preferably includes a computer program product that causes the service provider to determine whether a user-generated identification pin is an authorized identification pin and further whether a user-generated operating parameter is an authorized operating parameter respectively. In a preferred embodiment, the user-generated identification pin and the user-generated operating parameter are embedded in the output signals respectively.

In particular, aforementioned computer program product preferably includes a control logic algorithm including and executing a plurality of chronological steps including the steps of: a. receiving the input signals from the user interface; and b. bifurcating the input signals into first and second segments respectively. Such first and second segments preferably correspond to the user-generated identification pin and the user-generated operating parameter respectively. The chronological steps may further include the steps of: c. determining whether the user-generated identification pin matches the authorized identification pin; and d. determining whether the user-generated operating parameter matches the authorized operating parameter.

If an answer to both of steps c. and d. are yes, then the computer program generates and transmits the instruction signal to the controller. If at least one answer to steps c. and d. are no, then the computer program generates and transmits an error signal to the user interface.

In one embodiment, the controller preferably includes a second communications device communicatively coupled to the service provider for wirelessly receiving the instruction signal from the service provider. A timer circuit is electrically coupled to the second communications device and a logic gate is electrically coupled directly to the second communications device and the timer circuit respectively. In this manner, the timer circuit automatically generates and transmits a true time signal to the logic gate when the second communications device receives the instruction signal. Further, the timer circuit generates and transmits a false time signal to the logic circuit after a predetermined period lapse from receiving the instruction signal.

The logic gate receives the instruction signal and the time signals and thereafter outputs a control signal corresponding to a status of the instruction signal and time signals respectively. The controller may further include a third communications device communicatively linked directly to the logic gate for receiving and transmitting the control signal to the lock. In particular, the control signal is false, when at least one of the instruction and time signals is false. Alternately, the control signal is true, when both of the instruction and time signals are true.

The lock preferably includes a fourth communications device communicatively coupled to the third communications device to thereby receive the control signal from the controller. A mechanical actuator may be electrically coupled directly to the fourth communications device and a key is preferably in direct communication with the mechanical actuator. In this manner, the mechanical actuator selectively biases the key between engaged and disengaged positions for toggling the lock between locked and unlocked modes respectively upon receiving the false and true control signals from the controller.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1:
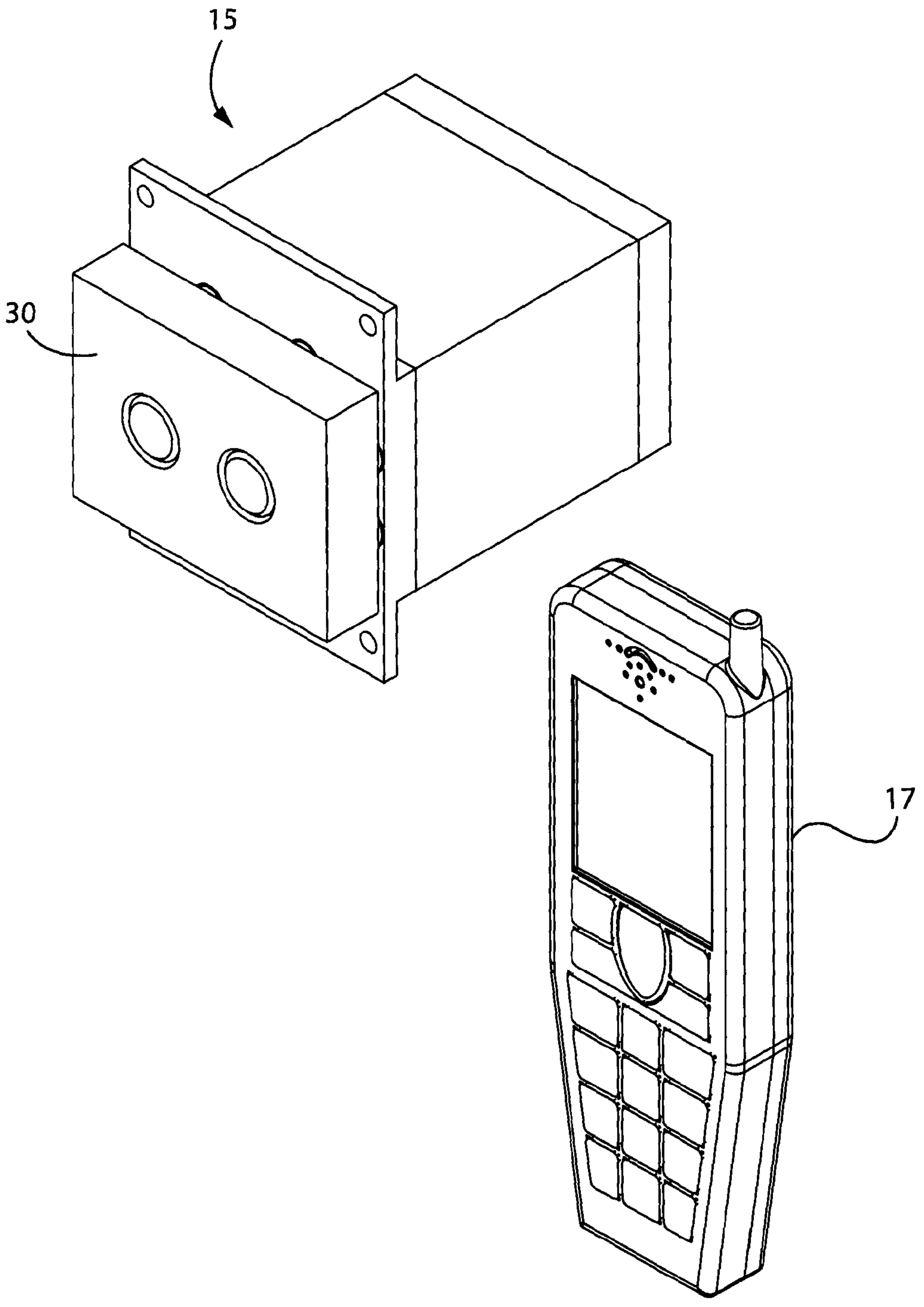
FIG. 1 is a perspective view showing an exemplary lock and cell phone, in accordance with the present invention.
Figure 2:
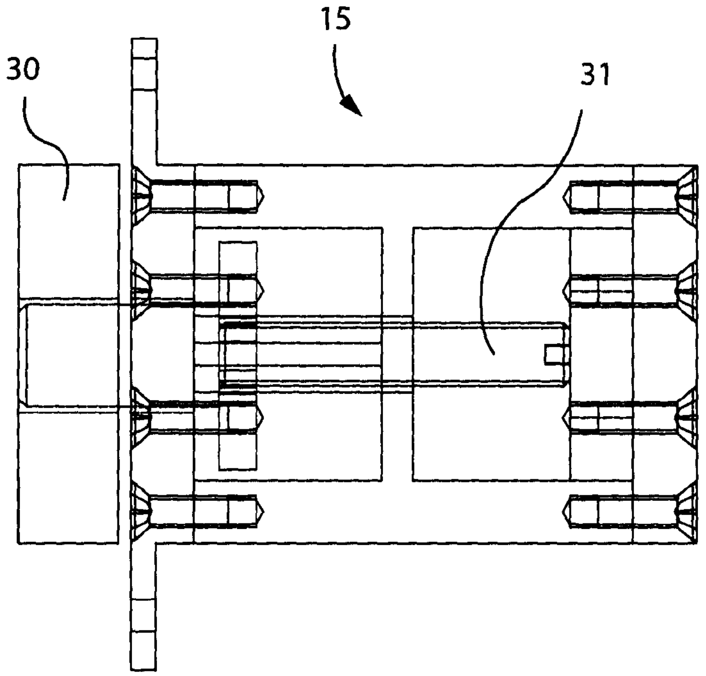
FIG. 2 is a side elevational view of the lock shown in FIG. 1.
Figure 3:
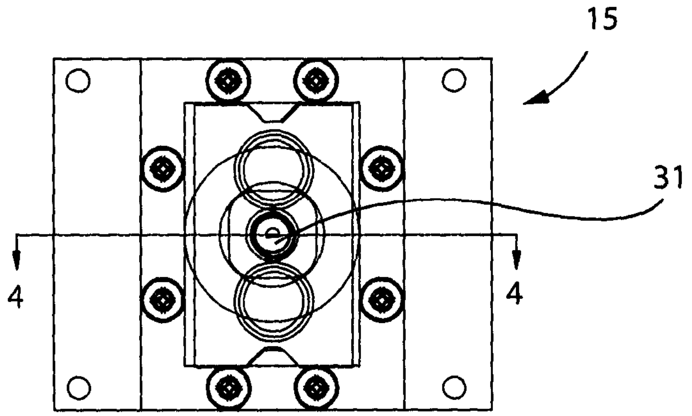
FIG. 3 is a front elevational view of the lock shown in FIG. 1.
Figure 4:
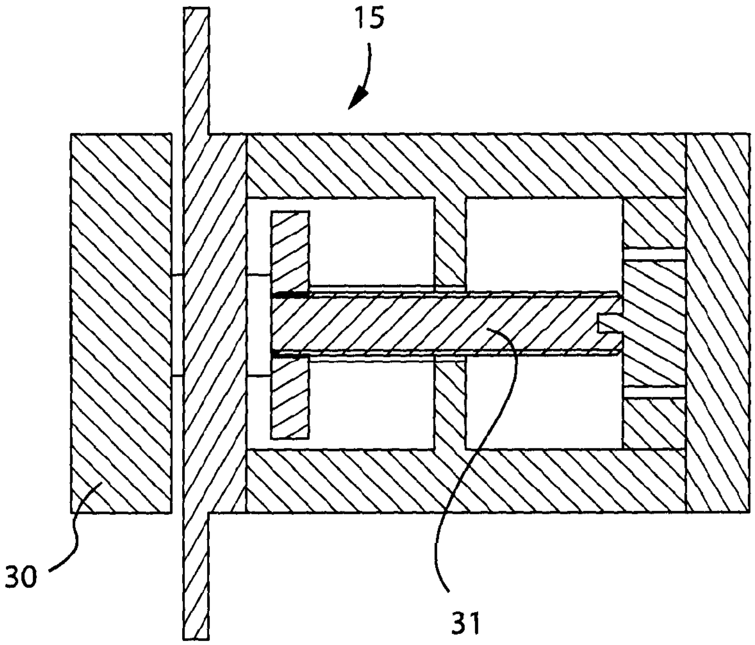
FIG. 4 is a cross-sectional view taken along line 4-4 in FIG. 3.

Those skilled in the art will appreciate that the figures are not intended to be drawn to any particular scale; nor are the figures intended to illustrate every embodiment of the invention. The invention is not limited to the exemplary embodiments depicted in the figures or the shapes, relative sizes or proportions shown in the figures.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The present invention is referred to generally in FIGS. 1-5 by the reference numeral 10 and is intended to provide a system, method and computer program product to remotely actuate a lock 15 between alternate operating modes by learning of real-time operating conditions of the lock 15 environment. It should be understood that the present invention 10 may be used to actuate many different types of locks 15 for a variety of operating systems such as doors, vehicles, appliances, alarms, heating/cooling systems, etc.

Referring to the figures in general, the system 10 is specially designed for remotely locking/unlocking and safeguarding a lock 15. Every lock 15 has a "key 31" that triggers the mechanism that engages or disengages (open and locks 15) the lock 15. With the present invention, this can be done with a pass code protected cellular phone call.

In one embodiment, the system 10 may include at least three parts: a controller 12; a lock 15; and a cellular communication link 37, 37' accessed via a conventional cell phone (calling unit) that gives the user the function of actuating the controller 12 and thereby toggling lock 15 between various operating modes.

In one embodiment, the entire system 10 could be made to be accessed via a conventional phone such as cell phone, home phone, pay phone, a designated handset device or via the internet, so long as such systems are capable of accessing and communicating over a cell phone communications network 37, 37'.

In one embodiment, the present invention may also provide notification signals directly to a user's personal cell phone or home phone when lock 15 has been tampered by an unauthorized user, thereby allowing the authorized user to remotely monitor and safeguard lock 15.

In other embodiments, the present system offers a user the benefit of activating (unlocking) or deactivating (locking) a cooling and heating system via the cell phone, and may even be designed to turn a vehicle's engine "on" or "off."

Referring to FIGS. 1-5, the present invention 10 discloses a wireless lock actuating system 10 for allowing a user to remotely toggle an existing device between operating and non-operating modes. Such wireless lock actuating system preferably includes a lock 15 adapted to be housed in an existing object and a user interface 17 adapted to be carried by the user.

The user interface 17 preferably generates input signals upon receiving corresponding user inputs respectively. The present invention 10 may further include a communications network 37, 37' communicatively linked to the user interface 17 for transferring the input signals to a remote location. A service provider 16 is disposed at the remote location may be communicatively coupled to the user interface 17 via the communications network 37, 37'. Such a service provider 16 is preferably responsive to the input signals by generating and transmitting instruction signals and inquiry signals upon receiving corresponding ones of the inputs signals respectively.

The present invention 10 may further include a controller 12 wirelessly coupled to the service provider 16, which is responsive to the instruction signals by generating and transmitting control signals to the lock 15 upon receiving the instruction signals respectively. In this manner, the lock 15 is automatically toggled between locked and unlocked modes upon receiving the control signals from the controller 12 respectively. In one embodiment, the controller 12 may be manually actuated between operating and non-operating modes so that the user can override the cell phone signals and thereby switch the controller 12 between on and off modes when the cellular network is not functioning.

Notably, the controller 12 automatically generates and transmits response signals to the service provider 16 upon receiving the inquiry signals from the service provider 16 such that the service provider 16 learns of unauthorized access to the lock 15. Thereafter, the service provider 16 records and transmits the response signals to the user interface 17 via the communications network 37, 37' such that the user learns of the unauthorized access to the lock 15.

For example, the controller 12 keeps a log of every time/date and phone number associated with an attempt to access the controller 12. In this manner, a chronological record is maintained so the user is able to review both the authorized access attempts as well as any unauthorized access attempts. Such information may be stored in a memory and printed out for safeguarding as well as electronically transmitted to an email address or the local police authorities.

Furthermore, the controller 12 can detect different types of unauthorized access to the lock 15 and thereafter generate a unique response signal (such as a unique ring tone or a unique text message) to the user interface 17 so that the user is able to quickly identify both the time of the breech as well as the type of the breech. Different types of breech may include unauthorized tampering of the lock 15 or controller 12 as well as repeated failed attempts to access the controller 12 via an unauthorized cell phone.

In one embodiment, the user interface 17 may include a mobile cell phone and the communication network may include a cellular communications network 37 respectively.

In another embodiment, the user interface 17 may include a LAN line phone and the communication network may include a POTS network 37' respectively.

The service provider 16 preferably includes a first communications device 32 in communication with the user interface 17 via the communication network 37, 37'. A processor 34 may be electrically coupled directly to the first communications device 32, and a memory 35 may be electrically coupled directly to the processor 34. The memory 35 preferably includes a computer program product that causes the service provider 16 to determine whether a user-generated identification pin is an authorized identification pin and further whether a user-generated operating parameter is an authorized operating parameter respectively. In a preferred embodiment, the user-generated identification pin and the user-generated operating parameter are embedded in the output signals respectively.

In particular, aforementioned computer program product preferably includes a control logic algorithm including and executing a plurality of chronological steps including the steps of: a. receiving the input signals from the user interface 17; and b. bifurcating the input signals into first and second segments respectively. Such first and second segments preferably correspond to the user-generated identification pin and the user-generated operating parameter respectively.

In one embodiment, the authorized identification pins may be predetermined by the service provider 16 and assigned to each user such that system 10 is able to track when and how often each user accesses lock 15. The authorized operating parameters may also be predefined and stored at the service provider 16. Exemplary operating parameters may restrict the time of day that the lock 15 can be accessed. Also, the lock 15 may be restricted from remote access during holidays, vacations, and other user-defined time periods.

For example, the user my program the controller 12 to accept only a limited number of authorized user interfaces 17 during specified time periods. For example, if a home owner is away on vacation, the controller 12 may be programmed to prohibit a child of the home owner from accessing the lock after a desired time. If the child misses his/her curfew, then the parent must call the controller 12 and reset the permitted time frame in which the child may access the controller 12.

In one embodiment, the lock 15 may require both an authorized signal from controller 12 as well as a manual input from the user by inserting a conventional key into the key slot of the lock 15. Therefore, even though the user provides the key to manually open/close the lock 15, the user is prohibited from accessing the lock 15 unless an authorized signal (cellular phone call) has been sent from the user interface 17 to the controller 12.

The chronological steps may further include the steps of: c. determining whether the user-generated identification pin matches the authorized identification pin; and d. determining whether the user-generated operating parameter matches the authorized operating parameter.

If an answer to both of steps c. and d. are yes, then the computer program generates and transmits the instruction signal to the controller 12. If at least one answer to steps c. and d. are no, then the computer program generates and transmits an error signal to the user interface 17.

In one embodiment, the controller 12 preferably includes a second communications device 39 communicatively coupled to the service provider 16 for wirelessly receiving the instruction signal from the service provider 16. A timer circuit 40 is electrically coupled to the second communications device 39 and a logic gate 41 is electrically coupled directly to the second communications device 39 and the timer circuit 40 respectively. In this manner, the timer circuit 40 automatically generates and transmits a true time signal to the logic gate 41 when the second communications device 39 receives the instruction signal from the first communications device 32. Further, the timer circuit 40 generates and transmits a false time signal to the logic gate 41 after a predetermined period lapse from receiving the instruction signal from the first communications device 32.

The logic gate 41 receives the instruction signal and the time signals and thereafter outputs a control signal corresponding to a status of the instruction signal and time signals respectively. The controller 12 may further include a third communications device 53 communicatively linked directly to the logic gate 41 for receiving and transmitting the control signal to the lock 15. In particular, the control signal is false, when at least one of the instruction and time signals is false. Alternately, the control signal is true, when both of the instruction and time signals are true.

The lock 15 preferably includes a fourth communications device 33 communicatively coupled to the third communications device 53 to thereby receive the control signal from the controller 12. A mechanical actuator 30 may be electrically coupled directly to the fourth communications device 33 and a key 31 is preferably in direct communication with the mechanical actuator 30. In this manner, the mechanical actuator 30 selectively biases the key 31 between engaged and disengaged positions for toggling the lock 15 between locked and unlocked modes respectively upon receiving the false and true control signals from the controller 12.

Figure 5:
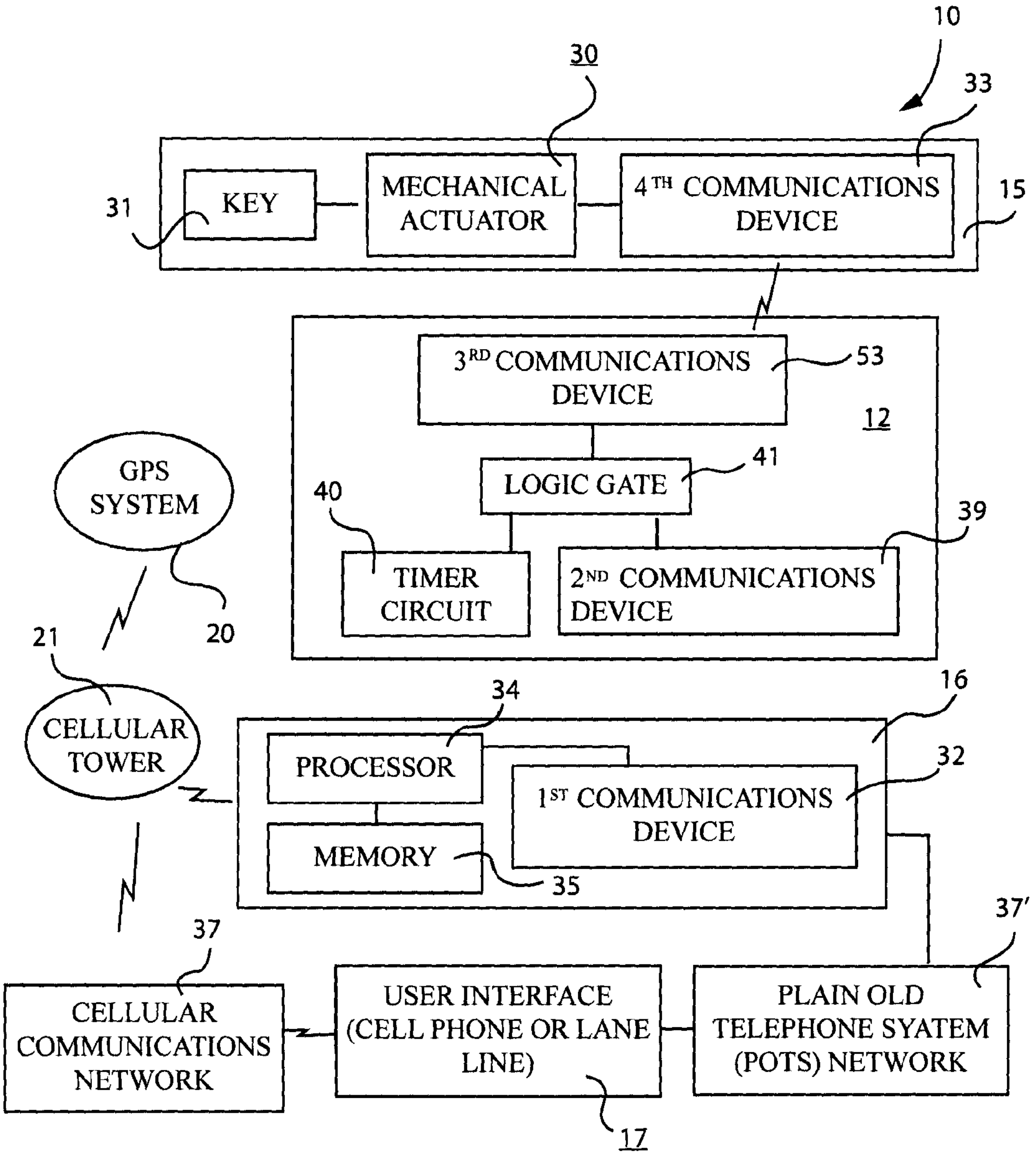
FIG. 5 is a high level schematic block diagram showing the interrelationship between the major components of the present invention.

In one embodiment, an object 10, such a home or vehicle compartment, contains a triggerable controller 12, as shown in FIG. 5. The controller 12 is most likely hidden somewhere in a home closet or vehicle engine, depending on the intended application. For example, the controller 12 may be integrated into a home's door bell system, alarm system, or other control modules that are communicatively coupled to a lock 15. The controller 12 can either be connected to an external power source associated with home or vehicle, or it may have a self-contained power source or sources, as well known by one skilled in the art.

In one embodiment, controller 12 receives a page from a paging system preferably initiated by the user or some automatic device located at the service provider 16. As an example, the page request can be initiated from an authorized user's cell phone that is communicatively linked to the service provider 16. The service provider 16 transmits encoded instruction signals for controlling the operating mode of the lock 15 such that lock 15 is selectively actuated between locked and unlocked modes.

In one embodiment, a home owner may request that the service provider 16 locate and identify a current operating modes of lock 15 at a predetermined time and day, which can be automatically changed depending on a holiday vacation, work hours, temperature conditions and special events, for example. The service provider 16 response is to send a page to the user's cell phone 17 so that the user can remotely monitor the status of one or more locks 15.

In one embodiment, a cellular network may be capable of sending out pages and could be used instead of the cellular paging system. Further, the present system 10 need not use a page to communicate between the service provider 16 and controller 12 but can use any system that allows the service provider 16 to uniquely address controller 12 via a broadcast signal. For example, very low frequency signals or HF radio signals could be used to communicate between the service provider 16 and controller 12.

When the control station (service provider 16) receives the page from the cell phone 17, it determines current status of lock 15 and direction of any movement (when the controller 12 and lock 15 are positioned in a vehicle) by accessing the signals of a GPS system 20, which comprises a plurality of satellites broadcasting signals which can be used to determine an object's location heading anywhere on the earth, as well known in the industry. The service provider 16 then formats the location information into a cellular telemetry stream and transmits it via the cellular system's telemetry channels. Advantageously, the user, for example, can manually quickly learn of the lock 15 status to thereby make a quick decision whether to activate or deactivate system 10 via the conventional hand-operable cellular telephone, as described hereinbelow.

In the AMPS (Advanced Mobile Phone System) cellular system, which is the analog cellular system used in the United States, each cellular base station has 832 channels. The 832 channels are divided among at least two competing cellular carriers. Each cellular carrier uses 21 of the 416 channels to carrying control signals. Each control channel includes a Forward Control Channel (FOCC) and a Reverse Control Channel (RECC).

The cellular base station uses the FOCC to send information to cellular telephones and the cellular telephones send information back to the cellular base station via the RECC. The FOCC and RECC are used to establish a cellular telephone call through a local switch. Once the cellular telephone call is established, the call is moved to one of the non-control channels and the released control channel is made available to establish other cellular telephone calls.

The cellular base station broadcasts a System Identification ("SID") signal, which identifies the cellular system to cellular telephones receiving it. When a cellular telephone is turned on, it compares the SID signal it receives against a SID stored within the telephone, which identifies the cellular telephone's home system. If the received SID is not the same as the stored SID, the cellular telephone is "roaming" and the "roam" indicator on the telephone is illuminated.

Subsequently, the cellular telephone transmits its identity to the cellular base station via the RECC. The RECC transmission includes the telephone's Mobile Identification Number ("MIN"), which is a unique 10-digit number (analogous to a telephone number including an area code) that is programmed into the cellular telephone. The first six digits of the MIN identify the cellular telephone's home system. The RECC also includes an Electronic Serial Number ("ESN"), a unique 32-bit serial number permanently stored in the cellular telephone which uniquely identifies the cellular telephone. The cellular base station will receive the MIN and ESN through the RECC and determine that the MIN does not correspond to a local number. Using the MIN, the cellular base station will determine the home system for the cellular telephone and send a validation signal to that system. The cellular local switches in the United States are interconnected through the Intersystem Signaling Network, IS-41, which allows them to send and receive validation information.

The validation signal, known under IS-41 as a Registration/Notification Invoke (REGNOT) message, includes the cellular telephone's MIN and ESN. The REGNOT message also includes the identity of the cellular base station sending the message. The cellular telephone's home system will respond with a Registration/Notification Return Result (REGNOT) message. In the REGNOT message, the cellular telephone's home system will either indicate that it will take financial responsibility for calls made by the cellular telephone or it will refuse to validate the cellular telephone. If validation occurs, a subsequent exchange of messages establishes the features (such as call forwarding) available to the cellular telephone.

The validation process just described uses the cellular system's control channels. Again, once a cellular telephone call is initiated the control channel that was used to set up the call is released for other purposes.

Returning to FIG. 5, upon receipt of the page from the GPS satellite, the control system (transmitter controller 12) determines the location and direction of movement (when controller 12 is positioned in a vehicle, for example), if any, of lock 15 using the GPS signals from the GPS system 20. The system then formats the location and movement information into the payload portion of a cellular RECC signal and transmits it to a local cellular tower 21. The MIN portion of the RECC signal may contain a unique MIN or it may be a MIN that is common to the triggerable location-reporting controller 12 serviced by a common service provider 16. Alternatively, the MIN may be different for each of the controller 12.

The service provider 16 can now communicate the location of the vehicle 10 to the control station, lien-holder, police or any other regulatory agency.

The present invention 10 further includes a method for remotely toggling an existing device between operating and non-operating modes, the method system including the chronological steps of: providing and housing a lock 15 in an existing object; the user providing and carrying a user interface 17; providing and communicatively linking a communications network 37, 37' to the user interface 17.

The method may further include the chronological steps of: the user interface 17 generating input signals upon receiving corresponding user inputs respectively; providing a service provider 16 disposed at a remote location; providing and wirelessly coupling a controller 12 to the service provider 16; communicatively coupling the service provider 16 to the user interface 17 via the communications network 37, 37'. The communications network 37, 37' then transfers the input signals to the remote location.

Upon receiving corresponding ones of the inputs signals, the service provider 16 respectively generating and transmitting instruction signals and inquiry signals. Upon receiving the instruction signals, the controller 12 respectively generating and transmitting control signals to the lock 15. Upon receiving the control signals from the controller 12 respectively, the lock 15 is automatically toggled between locked and unlocked modes. Upon receiving the inquiry signals from the service provider 16, the controller 12 automatically generating and transmitting response signals to the service provider 16 such that the service provider 16 learns of unauthorized access to the lock 15.

The method may further include the chorological step of: the service provider 16 recording and transmitting the response signals to the user interface 17 via the communication network 37, 37' 37, 37' such that the user learns of the unauthorized access to the lock 15.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A wireless lock actuating system for allowing a user to remotely toggle an existing device between operating and non-operating modes, said wireless lock actuating system including:

a lock adapted to be housed in an existing object;

a user interface adapted to be carried by the user, said user interface generating input signals upon receiving corresponding user inputs respectively;

a communications network communicatively linked to said user interface for transferring said input signals to a remote location;

a service provider disposed at the remote location and being communicatively coupled to said user interface via said communications network, said service provider being responsive to said input signals by generating and transmitting instruction signals and inquiry signals upon receiving corresponding ones of said inputs signals respectively; and a controller wirelessly coupled to said service provider and being responsive to said instruction signals by generating and transmitting control signals to said lock upon receiving said instruction signals respectively;

wherein said lock is automatically toggled between locked and unlocked modes upon receiving said control signals from said controller respectively;

wherein said service provider comprises:

a first communications device in communication with said user interface via said communications network;

a processor electrically coupled directly to said communications device; and a memory electrically coupled directly to said processor, said memory including a computer program product that causes said service provider to determine whether a user-generated identification pin is an authorized identification pin and further whether a user-generated operating parameter is an authorized operating parameter;

wherein said user-generated identification pin and said user-generated operating parameter are embedded in said output signals respectively;

wherein said computer program product comprises: a control logic algorithm including and executing a plurality of chronological steps including:

a. receiving said input signals from said user interface;

b. bifurcating said input signals into first and second segments respectively corresponding to said user-generated identification pin and said user-generated operating parameter respectively;

c. determining whether said user-generated identification pin matches said authorized identification pin;

d. determining whether said user-generated operating parameter matches said authorized operating parameter;

e. if an answer to both of steps c. and d. are yes, then generating and transmitting said instruction signal to said controller; and if at least one answer to steps c. and d. are no, then generating and transmitting an error signal to said user interface.

2. The wireless lock actuating system of claim 1, wherein said user interface comprises: a mobile cell phone, said communications network including a cellular communications network respectively.

3. The wireless lock actuating system of claim 1, wherein said user interface comprises: a local area network line phone, said communications network including a plain old telephone system network respectively.

4. The wireless lock actuating system of claim 1, wherein said controller comprises:

a second communications device communicatively coupled to said service provider for wirelessly receiving said instruction signal from said service provider;

a timer circuit electrically coupled to said second communications device;

a logic gate electrically coupled directly to said second communications device and said timer circuit respectively;

wherein said timer circuit automatically generates and transmits a true time signal to said logic gate when said second communications device receives said instruction signal, said timer circuit further generating and transmitting a false time signal to said logic gate after a predetermined period lapses from receiving said instruction signal;

wherein said logic gate receives said instruction signal and said time signals and thereafter outputs a control signal corresponding to a status of said instruction signal and time signals respectively; and a third communications device communicatively linked directly to said logic gate for receiving and transmitting said control signal to said lock;

wherein said control signal is false, when at least one of said instruction and time signals is false;

wherein said control signal is true, when both of said instruction and time signals are true.

5. The wireless lock actuating system of claim 4, wherein said lock comprises:

a fourth communications device communicatively coupled to said third communications device and thereby receiving said control signal from said controller;

a mechanical actuator electrically coupled directly to said fourth communications device; and a key in communication with said mechanical actuator;

wherein said mechanical actuator selectively biases said key between engaged and disengaged positions for toggling said lock between locked and unlocked modes respectively upon respectively receiving said false and true control signals from said controller.

6. A wireless lock actuating system for allowing a user to remotely toggle an existing device between operating and non-operating modes, said wireless lock actuating system including:

a lock adapted to be housed in an existing object;

a user interface adapted to be carried by the user, said user interface generating input signals upon receiving corresponding user inputs respectively;

a communications network communicatively linked to said user interface for transferring said input signals to a remote location;

a service provider disposed at the remote location and being communicatively coupled to said user interface via said communications network, said service provider being responsive to said input signals by generating and transmitting instruction signals and inquiry signals upon receiving corresponding ones of said inputs signals respectively; and a controller wirelessly coupled to said service provider and being responsive to said instruction signals by generating and transmitting control signals to said lock upon receiving said instruction signals respectively;

wherein said lock is automatically toggled between locked and unlocked modes upon receiving said control signals from said controller respectively;

wherein said controller automatically generates and transmits response signals to said service provider upon receiving said inquiry signals from said service provider such that said service provider learns of unauthorized access to said lock, said service provider recording and transmitting said response signals to said user interface via said communications network such that the user learns of the unauthorized access to said lock;

wherein said service provider comprises:

a first communications device in communication with said user interface via said communications network;

a processor electrically coupled directly to said first communications device; and a memory electrically coupled directly to said processor, said memory including a computer program product that causes said service provider to determine whether a user-generated identification pin is an authorized identification pin and further whether a user-generated operating parameter is an authorized operating parameter;

wherein said user-generated identification pin and said user-generated operating parameter are embedded in said output signals respectively;

wherein said computer program product comprises: a control logic algorithm including and executing a plurality of chronological steps including:

a. receiving said input signals from said user interface;

b. bifurcating said input signals into first and second segments respectively corresponding to said user-generated identification pin and said user-generated operating parameter respectively;

c. determining whether said user-generated identification pin matches said authorized identification pin;

d. determining whether said user-generated operating parameter matches said authorized operating parameter;

e. if an answer to both of steps c. and d. are yes, then generating and transmitting said instruction signal to said controller; and f. if at least one answer to steps c. and d. are no, then generating and transmitting an error signal to said user interface.

7. The wireless lock actuating system of claim 6, wherein said user interface comprises: a mobile cell phone, said communications network including a cellular communications network respectively.

8. The wireless lock actuating system of claim 6, wherein said user interface comprises: a local area network line phone, said communications network including a plain old telephone system network respectively.

9. The wireless lock actuating system of claim 6, wherein said controller comprises:

a second communications device communicatively coupled to said service provider for wirelessly receiving said instruction signal from said service provider;

a timer circuit electrically coupled to said second communications device;

a logic gate electrically coupled directly to said second communications device and said timer circuit respectively;

wherein said timer circuit automatically generates and transmits a true time signal to said logic gate when said first communications device receives said instruction signal, said timer circuit further generating and transmitting a false time signal to said logic gate after a predetermined period lapses from receiving said instruction signal;

wherein said logic gate receives said instruction signal and said time signals and thereafter outputs a control signal corresponding to a status of said instruction signal and time signals respectively; and a third communications device communicatively linked directly to said logic gate for receiving and transmitting said control signal to said lock;

wherein said control signal is false, when at least one of said instruction and time signals is false;

wherein said control signal is true, when both of said instruction and time signals are true.

10. The wireless lock actuating system of claim 9, wherein said lock comprises:

a fourth communications device communicatively coupled to said third communications device and thereby receiving said control signal from said controller;

a mechanical actuator electrically coupled directly to said fourth communications device; and a key in communication with said mechanical actuator;

wherein said mechanical actuator selectively biases said key between engaged and disengaged positions for toggling said lock between locked and unlocked modes respectively upon respectively receiving said false and true control signals from said controller.

* * * * *